United States Patent
Lu et al.

(10) Patent No.: US 6,813,812 B2
(45) Date of Patent: Nov. 9, 2004

(54) HINGE FOR A NOTEBOOK COMPUTER

(75) Inventors: Sheng-Nan Lu, Shulin (TW); Chia-Hui Chen, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 0 days.

(21) Appl. No.: 10/315,060

(22) Filed: Dec. 10, 2002

(65) Prior Publication Data

US 2004/0107539 A1 Jun. 10, 2004

(51) Int. Cl.⁷ .......................... E05D 11/10; E05C 17/64
(52) U.S. Cl. ........................... 16/342; 16/337; 361/681
(58) Field of Search .......................... 16/342, 337, 338, 16/274, 273, 277, 278, 330; 361/680–683, 803

(56) References Cited

U.S. PATENT DOCUMENTS

| | | | | |
|---|---|---|---|---|
| 5,566,048 A | * | 10/1996 | Esterberg et al. | 361/681 |
| 5,771,539 A | * | 6/1998 | Wahlstedt et al. | 16/285 |
| 5,826,307 A | * | 10/1998 | Chin-Fu | 16/340 |
| 5,896,622 A | * | 4/1999 | Lu | 16/342 |
| 5,951,312 A | * | 9/1999 | Horng | 439/165 |
| 6,085,388 A | * | 7/2000 | Kaneko | 16/338 |
| 6,170,120 B1 | * | 1/2001 | Lu | 16/342 |
| 6,378,171 B1 | * | 4/2002 | Suzuki et al. | 16/342 |
| 2002/0042971 A1 | * | 4/2002 | Liao | 16/342 |
| 2002/0133907 A1 | * | 9/2002 | Oshima et al. | 16/321 |
| 2002/0162192 A1 | * | 11/2002 | Su-Man | 16/337 |
| 2003/0000046 A1 | * | 1/2003 | Liao | 16/307 |

FOREIGN PATENT DOCUMENTS

JP 2002-227825 * 8/2002

* cited by examiner

*Primary Examiner*—Robert J. Sandy
*Assistant Examiner*—Andre' L. Jackson
(74) *Attorney, Agent, or Firm*—Dellett & Walters

(57) ABSTRACT

A hinge for a notebook computer has an L-shaped first seat with a first opening and a second opening. A barrel is mounted on the first seat, and has a rib received in the first opening, and an ear received in the second opening. A pintle rotatably extends in the barrel and mounted on a second seat by a butt of the pintle inserted through a third opening of the second seat. The first seat is mounted on an LCD monitor of the notebook computer, and the second seat is mounted on a body of the notebook computer. The hinge has a simple structure and a low cost.

7 Claims, 7 Drawing Sheets

HINGE FOR A NOTEBOOK COMPUTER

BACKGROUND OF THE INVENTION

1. Field of the Invention

The present invention is related to a hinge for a notebook computer.

2. Description of Related Art

A notebook computer has a body and an LCD monitor pivotally mounted on the body by a hinge. Conventional hinges generally have complex structures including basic elements such as a pintle, a barrel, and seats, and some assistant elements such as positioning rings, collars, washers, resilient members and so on. It is inconvenient and time-consuming to assemble these conventional hinges. Moreover, the conventional hinges with a large number of elements have high costs.

Therefore, the invention provides a hinge for a notebook computer to mitigate and/or obviate the aforementioned problems.

SUMMARY OF THE INVENTION

The main objective of the invention is to provide a hinge for a notebook computer which has a simple structure and a low cost.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
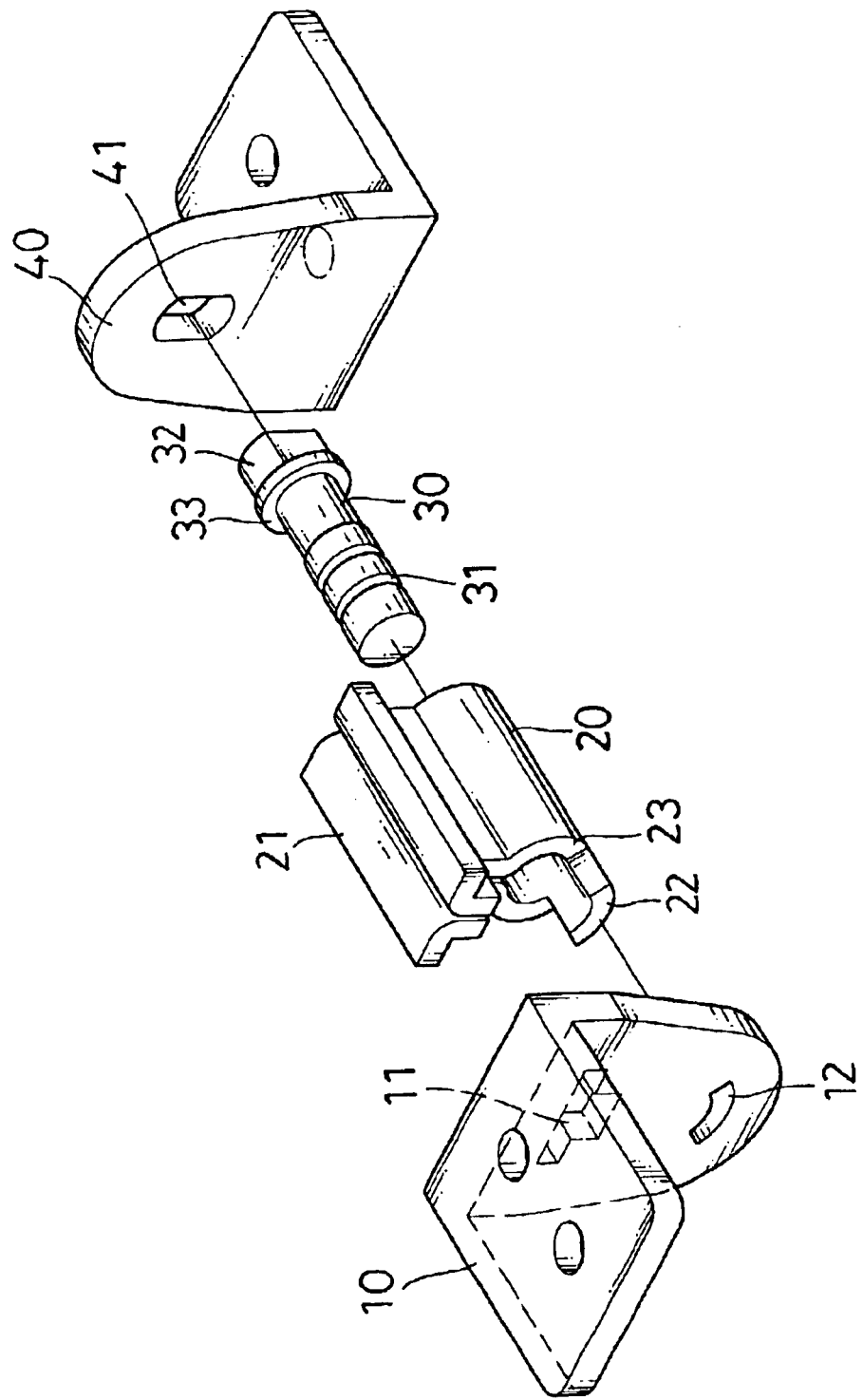
FIG. 1 is an exploded perspective view of a hinge for a notebook computer in accordance with the invention.
Figure 2:
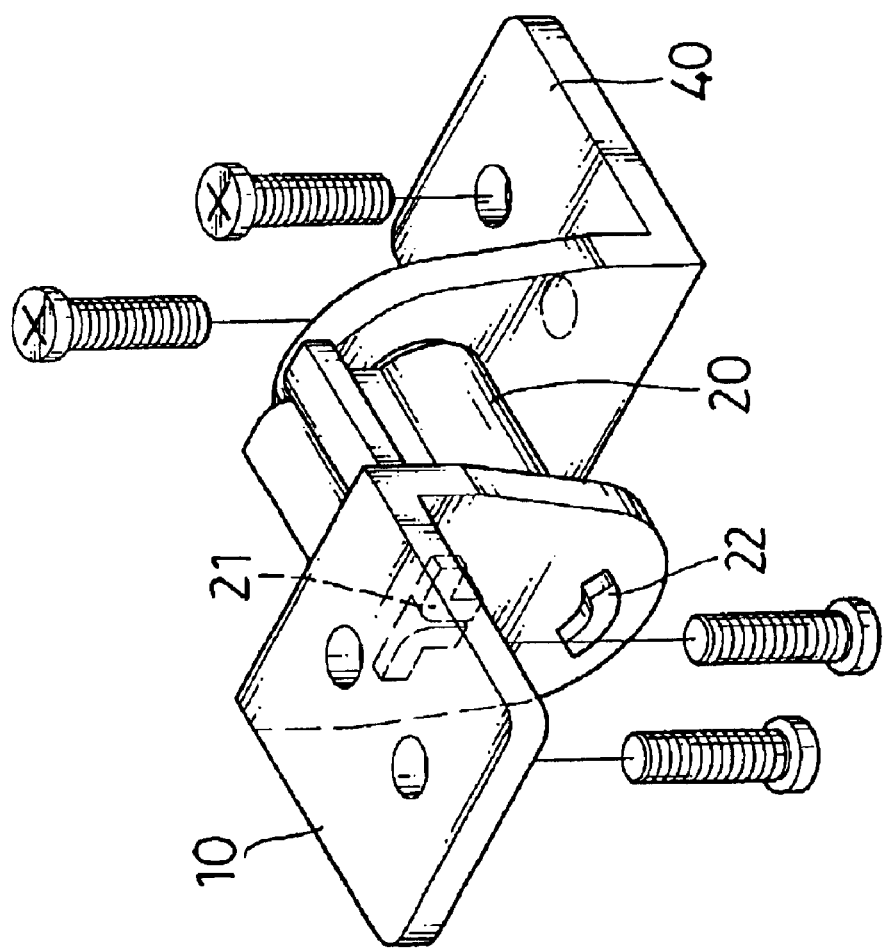
FIG. 2 is a perspective view of the hinge in FIG. 1.
Figure 3:
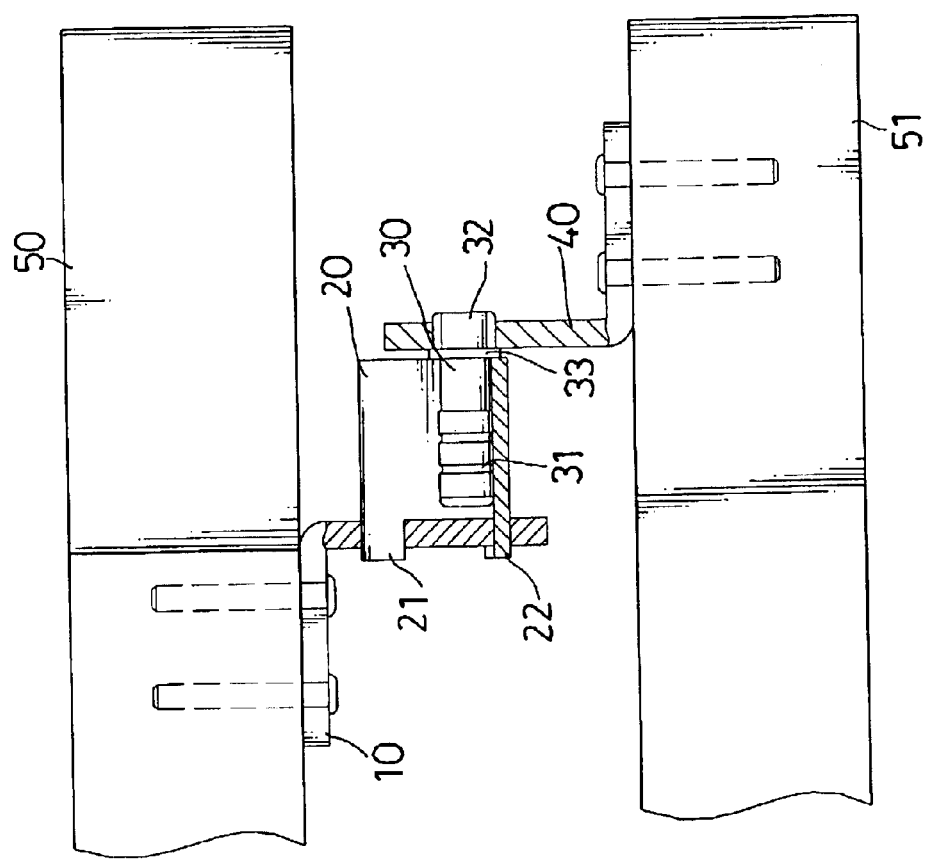
FIG. 3 is a sectional front view of the hinge assembled in a notebook computer.

Referring to FIG. 1, a hinge for a notebook computer is composed of a first seat (10), a barrel (20), a pintle (30), and a second seat (40).

The first seat (10) has an L-shaped form with a first lateral part (not numbered) and a first upright part (not numbered). A first opening (11) with a T-like section is defined through the first upright part, and a second opening (12) with an arcuate section is defined below the first opening (11).

The barrel (20) is mounted on a side of the first upright part of the first seat (10) away from the first lateral part. The barrel (20) has a T-like rib (21) longitudinally formed at an outer periphery thereof and protruded from an end surface (23) facing the first upright part of the first seat (10) to be received in the first opening (11). The rib (21) is composed of two L-shaped wings (not numbered) symmetrically formed together. An ear (22) is protruded from the end surface (23) to be received in the second opening (12).

The pintle (30) has an axle rotatably extending in the barrel (20). A plurality of round recesses (31) is circumferentially defined at the axle of the pintle (30) for storing lubrication. A butt (32) is formed at an end of the pintle (30) opposite to the axle and mounted on the second seat (40). A flange (33) is formed between the axle and the butt (32).

The second seat (40) has an L-shaped form with a second lateral part (not numbered) and a second upright part (not numbered). A third opening (41) is defined through the second upright part to receive the butt (32).

Figure 5:
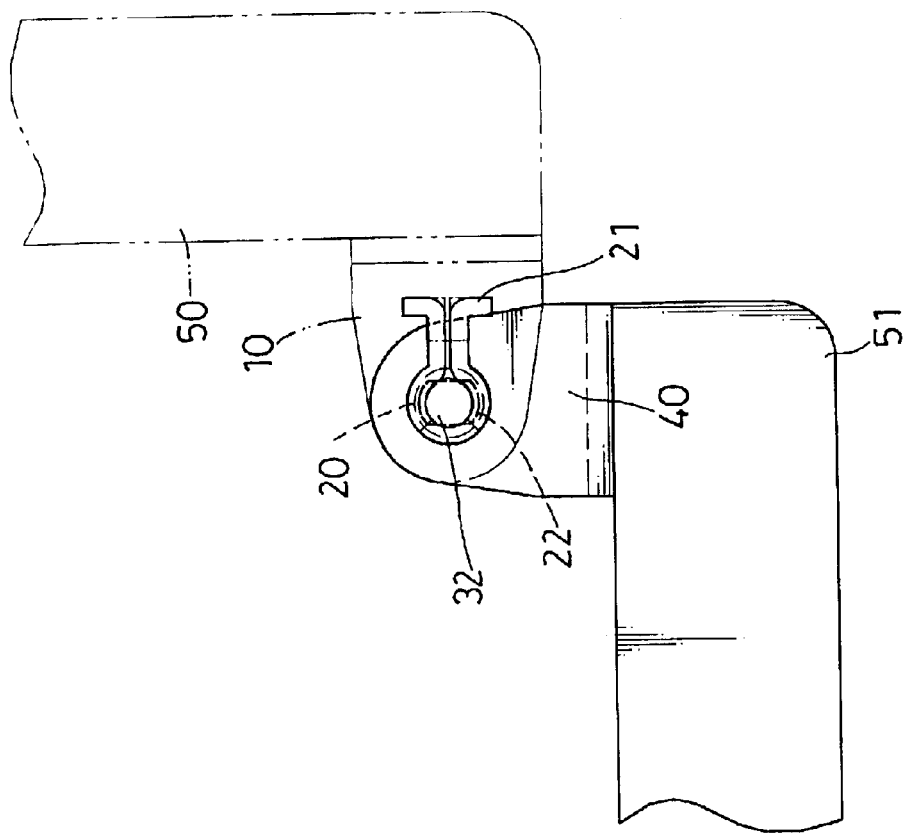
FIG. 5 is a sectional side view of the hinge when the LCD monitor is raised.
Figure 4:
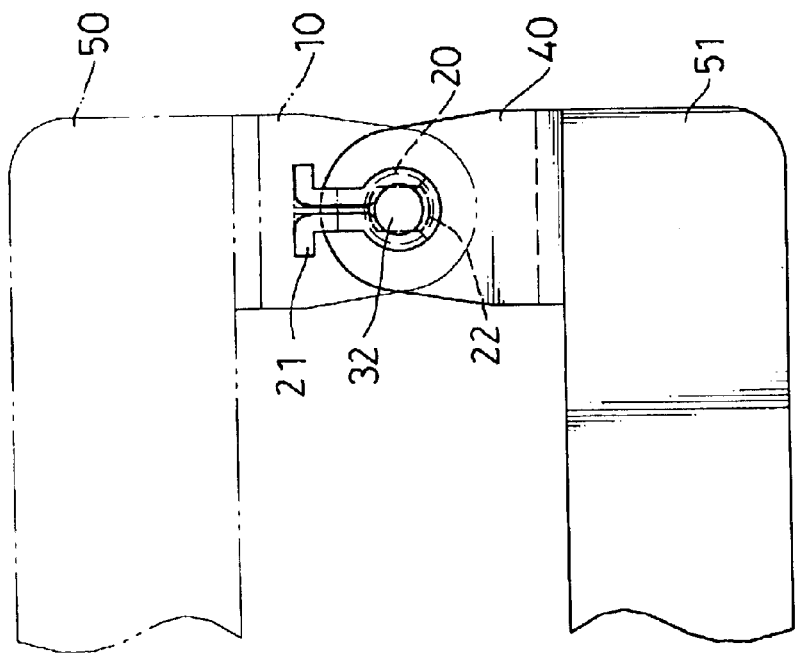
FIG. 4 is a sectional side view of the hinge when an LCD monitor of the notebook computer abuts a body.
Figure 6:
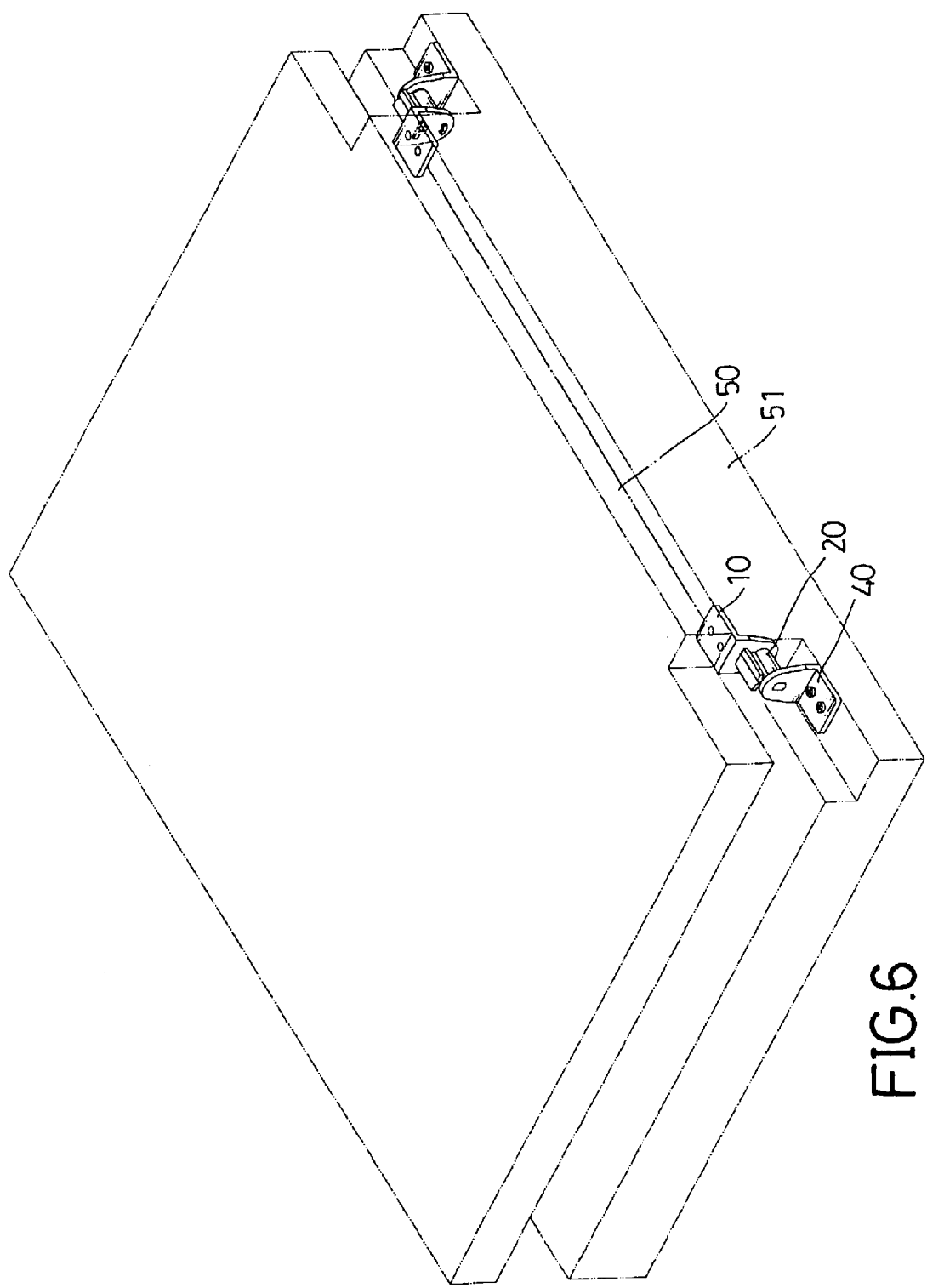
FIG. 6 is a perspective view of the notebook computer assembled with the hinges in accordance with the invention.

Referring to FIGS. 2, 3, 4, and 6, by fasteners, the first seat (10) is fastened on an LCD monitor (50) of a notebook computer, and the second seat (40) is fastened on a body (51) of a notebook computer. As illustrated in FIG. 5, when the LCD monitor (50) is raised by a user, the barrel (20) along with the first seat (10) can be turned about the pintle (30) and the second seat (40) secured on the body (51).

Figure 7:
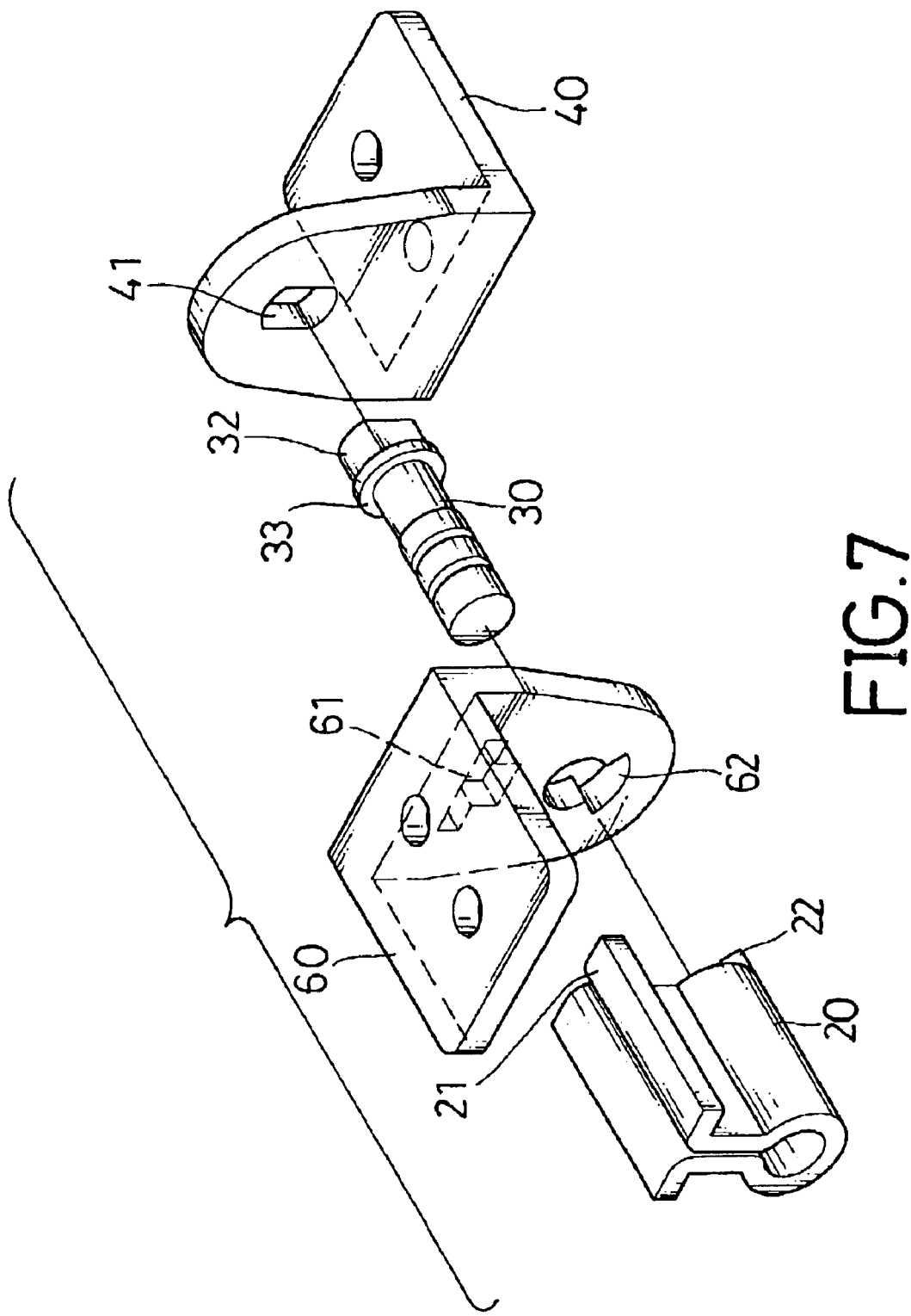
FIG. 7 is an exploded perspective view of a second embodiment of the hinge in accordance with the invention.
Figure 8:
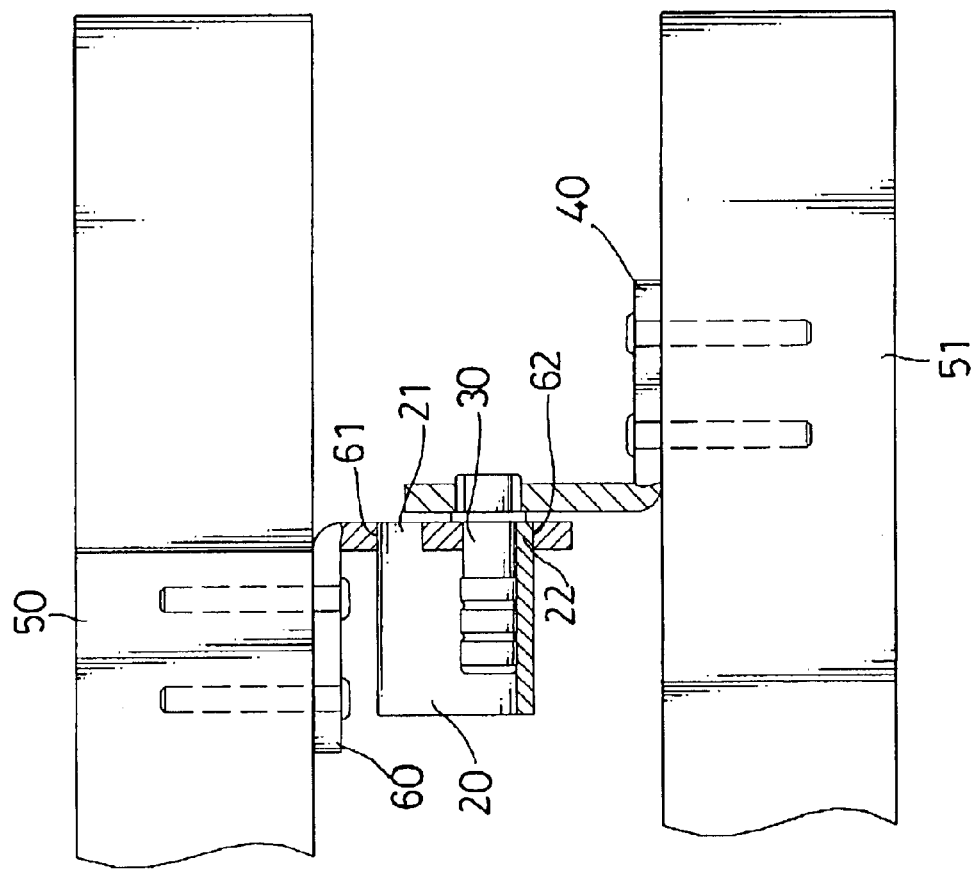
FIG. 8 is a sectional front view of the hinge in FIG. 7 assembled in a notebook computer.

Referring to FIGS. 7 and 8, in a second embodiment of the invention, the hinge has a first seat (60) with a first lateral part and a first upright part. A first opening (61) with a T-like section is defined through the first upright part, and a second opening (62) is defined below the first opening (61). The second opening (62) has a circular portion (not numbered) and an arcuate portion (not numbered).

The barrel (20) is mounted on a side of the first upright par of the first seat (60) adjacent the first lateral part. The T-like rib (21) is received in the first opening (61), and the ear (22) is received in the arcuate portion of the second opening (62).

The pintle (30) rotatably extends through the circular portion of the second opening (62) and in the barrel (20), and is mounted on the second seat (40) by the butt (32) received in the third opening (41).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer comprising:

a first seat (60) with a first lateral part and a first upright part formed as an L-shape, the first seat (60) having a first opening (61) defined through the first upright part and a second opening (62) defined below the first opening (61);

a barrel (20) mounted on a side of the first upright part of the first seat (60) adjacent the first lateral part, the barrel (20) having a rib (21) longitudinally formed at an outer periphery thereof and protruded from an end surface (23) facing the first upright part of the first seat (60) to receive in the first opening (61) wherein the rib (21) has a T-like section, and the first opening (61) has a T-like section matching the section of the rib (21), the rib (21) is composed of two L shaped wings symmetrically formed together, and an ear (22) protruded from the end surface (23) to be received in the second opening (62);

a pintle (30) having an axle rotatably extending through the second opening (62) and in the barrel (20), a butt (32), and a flange (33) formed between the axle and the butt (32); and a second seat (40) with a second lateral part and a second upright part formed as an L-like shape, the second seat (40) having a third opening (41) defined through the second upright part to receive the butt (32).

2. The hinge as claimed in claim 1, wherein the ear (22) has an arcuate section, and the second opening (62) has a circular portion through which the axle (30) extends, and an arcuate portion in which the ear (22) is received.

3. The hinge as claimed in claim 1, wherein the pintle (30) has a plurality of round recesses (31) circumferentially defined at the axle.

4. A hinge for a notebook computer comprising:

a first seat (10) with a first lateral part and a first upright part formed as an L-shape, the first seat (10) having a first opening (11) defined through the first upright part and a second opening (12) defined below the first opening (11);

a barrel (20) mounted on a side of the first upright part of the first seat (10) away from the first lateral part, the barrel (20) having a rib (21) longitudinally formed at an outer periphery thereof and protruded from an end surface (23, facing the first upright part of the first seat (10) to be received in the first opening (11), wherein the rib (21, is composed of two L-shaped wings symmetrically formed together, and an ear (22) protruded from the end surface (23) to be received in the second opening (12);

a pintle (30) having an axle rotatably extending in the barrel (20), a butt (32), and a flange (33) formed between the axle and the butt (32); and a second seat (40) with a second lateral part and a second upright part formed as an L-like shape, the second seat (40) having a third opening (41) defined through the second upright part to receive the butt (32).

5. The hinge as claimed in claim 4, wherein the rib (21) has a T-like section, and the first opening (11) has a T-like section matching the section of the rib (21).

6. The hinge as claimed in claim 4, wherein the ear (22) has an arcuate section, and the second opening (12) has an arcuate section matching the section of the ear (22).

7. The hinge as claimed in claim 4, wherein the pintle (30) has a plurality of round recesses (31) circumferentially defined at the axle.

* * * * *